(12) United States Patent
Talbot et al.

(10) Patent No.: US 10,624,266 B2
(45) Date of Patent: Apr. 21, 2020

(54) CONNECTING ENDS OF THE DRAPER CONVEYOR OF A HARVEST HEADER

(71) Applicant: MacDon Industries Ltd., Winnipeg (CA)

(72) Inventors: Francois R. Talbot, Winnipeg (CA); Romain Etienne Guy Coudiere, Winnipeg (CA)

(73) Assignee: MacDon Industries Ltd., Wpg, MB (CA)

( * ) Notice: Subject to any disclaimer, the term of this patent is extended or adjusted under 35 U.S.C. 154(b) by 171 days.

(21) Appl. No.: 15/882,334

(22) Filed: Jan. 29, 2018

(65) Prior Publication Data

US 2019/0230862 A1    Aug. 1, 2019

(51) Int. Cl.
| | |
|---|---|
| *A01D 61/02* | (2006.01) |
| *B65G 15/56* | (2006.01) |
| *A01D 61/00* | (2006.01) |
| *A01D 34/04* | (2006.01) |

(52) U.S. Cl.
CPC ........... *A01D 61/02* (2013.01); *A01D 61/002* (2013.01); *B65G 15/56* (2013.01); *A01D 34/04* (2013.01)

(58) Field of Classification Search
CPC ...... A01D 57/20; A01D 61/002; A01D 61/02; A01D 2017/103; A01D 17/10; A01D 41/14; A01D 2017/108; A01D 34/04; F16G 3/06; B65G 15/52; B65G 15/56
See application file for complete search history.

(56) References Cited

U.S. PATENT DOCUMENTS

| | | | | |
|---|---|---|---|---|
| 453,019 | A * | 5/1891 | McCombs | F16G 3/06 24/37 |
| 1,235,656 | A * | 8/1917 | Cobb | F16G 3/06 24/37 |
| 1,570,801 | A * | 1/1926 | Vollrath | F16G 3/06 24/37 |
| 2,324,171 | A * | 7/1943 | Paradise | A01D 61/02 198/836.1 |
| 2,347,365 | A * | 4/1944 | Paradise | A01D 57/20 198/699 |
| 4,757,576 | A * | 7/1988 | Jaubert | F16G 3/06 198/844.2 |

(Continued)

FOREIGN PATENT DOCUMENTS

DE        29716333 U1 * 12/1997 ............. A01D 17/10

*Primary Examiner* — Arpad Fabian-Kovacs
(74) *Attorney, Agent, or Firm* — Adrian D. Battison; Ade & Company Inc; Ryan W. Dupuis

(57) ABSTRACT

A draper having an additional strip of a resilient material attached on to the outer surface of the base layer at the front edge is connected at ends to form a continuous loop by a coupling comprising a first and second end edge which are turned so as to stand upwardly from the band and a clamping assembly clamping the upwardly standing edges together. The additional band at each end of the canvas is recessed from the outer surface and a strip portion formed of a flexible continuous strip material extending longitudinally of the additional band connects the two ends. The strip is bolted at each end to the recessed portion and has a thickness so that its outer surface is slightly less than that of the additional band thus forming in effect a continuation of the band bridging the ends of the canvas.

16 Claims, 6 Drawing Sheets

(56) References Cited

U.S. PATENT DOCUMENTS

| | | | | |
|---|---|---|---|---|
| 5,459,986 A * | 10/1995 | Talbot | ............ | A01D 61/002 56/14.5 |
| 5,671,839 A * | 9/1997 | Sanderson | ............ | A01D 17/10 198/846 |
| 6,238,131 B1 * | 5/2001 | Watts | ............ | A01D 61/02 403/337 |
| 6,351,931 B1 * | 3/2002 | Shearer | ............ | A01D 57/20 56/14.5 |
| 7,070,042 B2 * | 7/2006 | Dow | ............ | B65G 23/04 193/37 |
| 7,344,020 B2 * | 3/2008 | Grywacheski | ............ | A01D 61/02 198/844.2 |
| 7,661,256 B2 * | 2/2010 | Coers | ............ | A01D 61/002 198/844.2 |
| 7,690,500 B2 * | 4/2010 | Coers | ............ | A01D 61/02 198/699 |
| 7,958,711 B1 * | 6/2011 | Sauerwein | ............ | A01D 57/20 56/181 |
| 8,484,938 B2 * | 7/2013 | Cormier | ............ | A01D 61/002 56/181 |
| 9,033,139 B2 * | 5/2015 | Jager | ............ | B65G 15/48 198/850 |
| 9,622,412 B2 * | 4/2017 | Hasenour | ............ | A01D 57/20 |
| 9,635,810 B2 * | 5/2017 | Leys | ............ | A01D 41/14 |
| 2007/0193243 A1 * | 8/2007 | Schmidt | ............ | A01D 41/14 56/181 |
| 2008/0092508 A1 * | 4/2008 | Talbot | ............ | A01D 57/20 56/181 |

\* cited by examiner

US 10,624,266 B2

CONNECTING ENDS OF THE DRAPER CONVEYOR OF A HARVEST HEADER

This invention relates to a draper conveyor for a harvesting header for cutting and transporting a crop with a transverse leading cutter bar and particularly to an arrangement which provides a connection between ends of the draper canvas to form a continuous loop.

BACKGROUND OF THE INVENTION

Draper headers generally include a header frame, an elongate cutter bar along a front edge of the frame including a cutter bar beam which carries a plurality of knife guards for guiding reciprocating movement of a sickle knife across a front edge of the cutter bar. On the header is also mounted a draper deck assembly including a draper drive and idler roller each arranged at a respective end of the draper assembly spaced apart along the cutter bar with an axis of each roller extending substantially at right angles to the cutter bar, a draper forming a continuous loop of flexible material wrapped around the rollers so as to define a front edge of the draper adjacent the cutter bar, a rear edge of the draper spaced rearwardly of the cutter bar, top strand of the draper on top of the roller and a bottom strand of the draper below the rollers. The cut crop thus falls rearwardly onto the top strand of the canvas and is transported longitudinally of the header.

The header of this type can be used simply for forming a swath in which case the material is carried to a discharge opening of the header and deposited therefrom onto the ground. Headers of this type can also be used for feeding a combine harvester so that the materials are carried to an auger positioned at the discharge opening of the header for carrying the materials from the discharge opening into the feeder-house of the combine harvester. Yet further, headers of this type can be used for hay conditioners in which the material from the discharge opening is carried into conditioning rolls. It will be appreciated, therefore, that the use of the header is not limited to particular types of agricultural machine but can be used with any such machine in which it is necessary to cut a crop and to transport that crop when cut longitudinally of the header for operation thereon.

The draper normally comprises a fabric which is coated with a rubber material which is then vulcanized after forming of the fabric into the required shape and after attachment thereto of transverse slats.

SUMMARY OF THE INVENTION

According to the present invention there is provided a draper canvas for a cutter bar of a harvesting header comprising:

a band of flexible material arranged to be wrapped around drive and idler rollers so as to define top strand of the draper on top of the rollers and a bottom strand of the draper below the rollers and so as to define an outer surface of the draper which faces outwardly of the loop that the outer surface forms the upper surface of the top strand and the lower surface of the bottom strand and an opposed inner surface of the draper canvas which faces inwardly of the loop;

the draper including a base layer of a sheet material having a front edge of the base layer defining the front edge of the draper and a rear edge of the base layer defining a rear edge of the draper;

the draper including an additional strip of a resilient material attached on to the outer surface of the base layer at or adjacent the front edge of the base layer so as to stand outwardly from the outer surface of the base layer and extending rearwardly from the front edge of the base layer to a rear edge of the additional strip spaced rearwardly of the front edge of the base layer and forwardly of the rear edge of the base layer;

the additional strip standing outwardly of the outer surface from the base layer to define an outer surface of the additional strip raised from the base layer;

the band including a coupling of a first end of the band to a second end of the band to form a continuous loop;

the coupling comprising a first end edge at the first end which is turned so as to stand upwardly from the band, a second end edge at the second end which is turned so as to stand upwardly from the band and a clamping assembly for clamping the upwardly standing edges together;

the first and second end edges and the clamping assembly extending across the band to a front end at or rearward of the rear edge of the additional strip;

the additional band at the first end edge being recessed to define a first portion thereof at the first end edge which is recessed from the outer surface of the additional strip;

the additional band at the second end edge being recessed to define a second portion thereof at the second end edge which is recessed from the outer surface of the additional strip;

and a strip portion formed of a flexible continuous strip material extending longitudinally of the additional band and connecting the first portion to the second portion.

Preferably the strip portion is fastened by first and second bolts respectively to the first and second portions. However other fastening arrangements can be used which connect the end of the strip portion to the recessed portions of the additional band. Preferably the strip portion has a width no greater than that of the additional band and typically substantially equal to the width of the additional band. Also preferably the strip portion has ends closely adjacent ends of the first and second portions. In this way the recessed portions of the additional band extend across the full width of the additional band and the strip portion forms in effect a continuation of the additional band. However the strip portion and the recessed portions can be narrower than the additional band.

Preferably the first and second portions have a thickness of the order of one half of the thickness of the additional band and the strip portion has a thickness equal to or lightly less than one half the thickness of the additional band so that in total the two components have thickness roughly matching that of the additional band. In this way an upper surface of the strip portion lies in a plane no higher than the outer surface and the outer surface of the strip portion is approximately a continuation of the outer surface of the additional band so that it acts in a continuous contacting relationship with a component of the cutter bar without causing steps or discontinuities which would allow the contact to break and the movement of the additional band along the cutter bar to become disturbed.

In addition it is preferred for the same reason that the strip portion is formed of a material which has a flexibility substantially equal to that of the additional band. Thus the strip portion can be formed of a rubber material.

When connected by first and second bolts respectively to the first and second portions, each bolt preferably has a substantially flat head which has an upper surface which lies in a plane no higher than the outer surface of the additional band so as to avoid forming an obstruction or impediment to the contact between the outer surface and a component of the cutter bar.

Preferably the first and second bolts each have a nut extending downwardly from the inner surface of the canvas at the additional band. In the situation where the draper includes a typically V-shaped guide bead on the inner surface of the draper at the additional band for running in guide grooves of the guide rollers, preferably the nut does not substantially exceed the cross-section of the bead so that it can enter the guide groove while guide groove acts as a guide for the bead.

Typically the draper includes a plurality of slats extending across the band where a front edge of each slat is located at or rearward of the rear edge of the additional strip.

Preferably the clamped standing portions have a height greater than the upper surface of the strip portion.

Preferably the clamping assembly comprise a pair of tubes each of a respective side of the standing portions.

In most cases, the additional band is arranged for cooperation with a component of the cutter bar extending rearwardly over the top strand of the draper to a position rearwardly of the front edge of the top strand of the draper and engaging the outer surface of said additional strip on the draper so that the engagement or close proximity between the component of the cutter bar and the outer surface of the additional strip forms a seal to inhibit entry between the cutter bar and the draper of materials carried by the cut crop. The component of the cutter bar can be an integral part of the metal structure of the cutter bar or can be a separate component which extends rearwardly from the structural cutter bar itself.

The draper herein preferably is used in combination with a header for cutting and transporting a standing crop comprising:

a header frame;

an elongate cutter bar arranged along a front edge of the frame;

a knife mounted on the cutter bar for cutting the standing crop;

a draper assembly mounted on the header frame rearwardly of the cutter bar such that out crop falls onto the draper assembly for transportation longitudinally of the header;

the draper assembly including a drive and an idler draper roller each arranged at a respective end of the draper assembly spaced apart along the cutter bar with an axis of each roller arranged substantially at right angles to the cutter bar.

The arrangement herein can prevent:

The un-connected draper edge catching on the cutter bar or seal and causing the draper to ride on top of the cutter bar or seal;

Inability to properly seal the draper at the connection;

Premature wear or failure of the draper at the ends of the connector.

The arrangement provides means of connecting the draper at the ends with a connecting member that does not protrude past the top surface of the draper sealing bead, and such that any protrusion on the inside of the draper does not interfere with any mechanical parts.

In this invention, a connection is made by first removing a short portion of the draper seal bead and then installing a piece of either a draper-like material, or a rubber-like material about the same width as the draper sealing bead that is typically approximately 1 inch and fastened to the draper with two elevator bolts.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

The conventional header of the PRIOR ART comprises a frame, one element of which is indicated at 10 in the form of a beam extending horizontally and forwardly from a rear support frame structure (not shown) to a cutter bar assembly generally indicated at 11 for support of that cutter bar assembly. The beam 10 forms one of a plurality of such beams arranged at spaced positions along the length of the header frame so as to support the cutter bar assembly 11 as an elongate structure across the front edge of the header.

Figure 1:
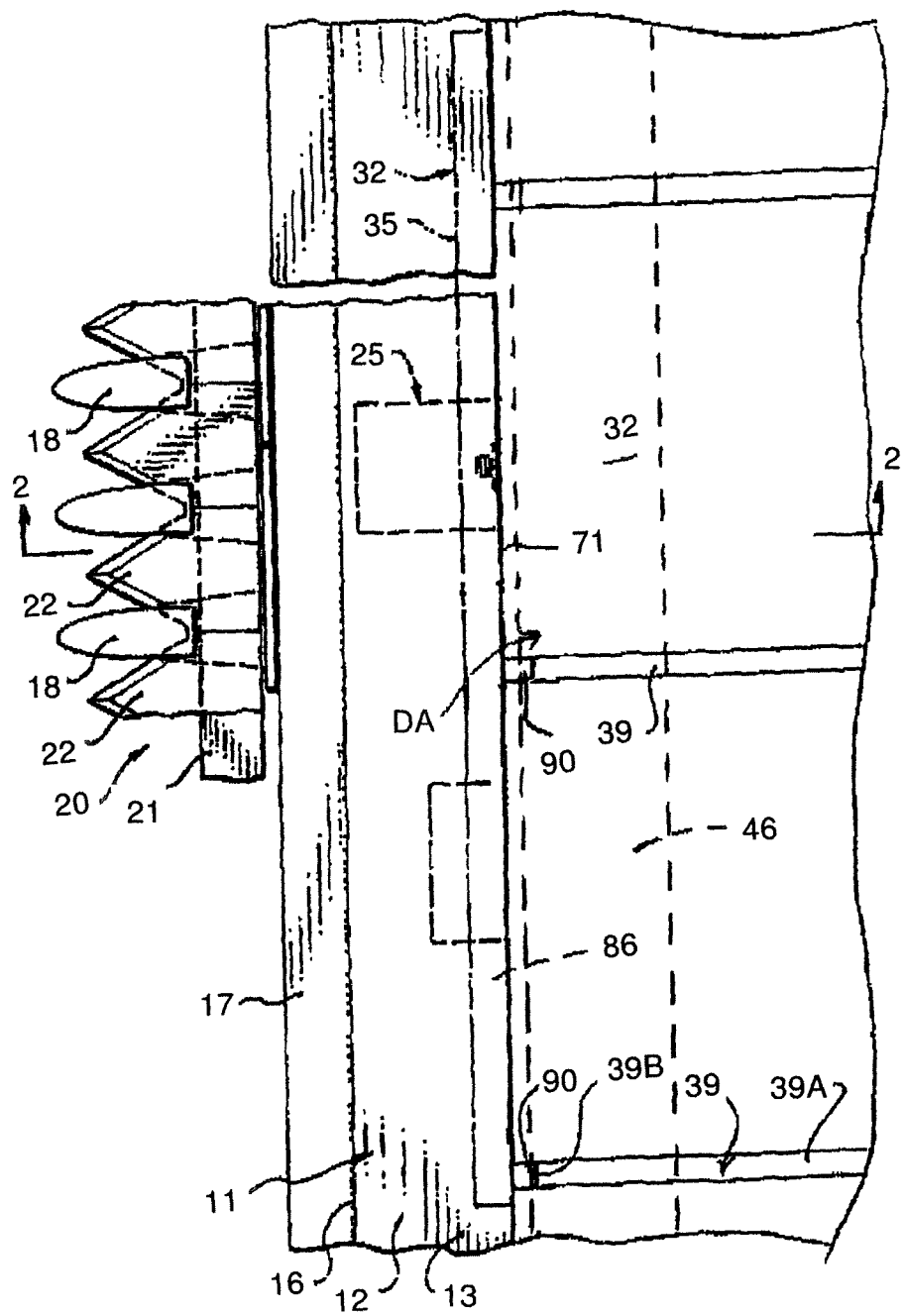
FIG. 1 is a top plan view of the front part of a header from the PRIOR ART.

The cutter bar comprises a generally C-shaped beam 12 which provides structural support for the cutter bar with the C-shaped beam being welded to the front ends of the forwardly extending beams 10. The C-shape beam 12 includes a top plate portion 13, a bottom plate portion 14 and a forward plate portion 15 which converges from the top and bottom plate portions toward a front apex 16 forming a forward most point of the beam 12. At the apex 16 is welded a longitudinally extending bar 17 which forms a support for a plurality of knife guards 13 only some of which are shown in FIG. 1 for convenience of illustration. The knife guards are of course of well-known construction and their shape is shown only schematically. The knife guards carry a sickle knife assembly 20 having a longitudinally reciprocating bar 21 driving a plurality of triangular knife blades 22 which sit on the knife guards and reciprocate back and forth across the knife guards in a cutting action. Again this construction is well known and therefore detail is not necessary.

The cutter bar support beam 12 also carries an elongate angle iron 23 which is welded onto the top plate portion 13 on the underside thereof at the front edge thereof with the angle iron extending vertically downwardly and then forming a support plate 24 extending forwardly therefrom toward the apex 16.

The draper assembly generally indicated at DA includes a first draper support roller 30 and a second draper support roller (not shown). One of these rollers is driven by a drive motor (not shown) to effect rotation of the draper in conventional manner. The draper assembly further includes a draper 32 in the form of a continuous loop or band of fabric which is wrapped around the rollers at respective ends to form an top strand 33 of the draper on top of the rollers and a bottom strand 34 of the draper underneath the rollers. The rollers are thus spaced longitudinally of the cutter bar and arranged with their axes of rotation parallel and at right angles to the cutter bar. The draper thus includes a front edge 35 of the top strand which is adjacent the cutter bar and a rear edge 36 of the top strand 33 which is remote from the cutter bar and spaced rearwardly therefrom thus defining therebetween a flat surface of the top strand for transportation of the crop longitudinally of the header. The bottom strand 34 also includes a front edge 37 and a rear edge. The draper includes a plurality of conventional transverse slats 39 which assist in carrying the crop along the draper. Each edge of the draper can be formed by a double thickness section in which either a second ply is stacked upon the base layer and vulcanized together or there is provided a folded seam so as to define a portion of the canvas material which is folded back as indicated at 40 with that folded back portion being folded back on top of the fabric layer and bonded to the canvas by the vulcanization effect in the manufacture of the canvas.

The top strand of the draper is supported by a support plate assembly 45 which includes a front plate and includes a center plate and rear plates which are not shown for convenience of illustration. The front plate includes a horizontal top plate portion 46, shown in phantom in FIG. 1, lying underneath the top strand of the draper adjacent the front edge for supporting that front edge in sliding movement across the top surface of that plate. The support plate 46 further includes a vertical plate portion, which extends downwardly from a front edge of the top plate portion (not shown in the figures). At a bottom edge of the vertical plate portion is provided a lower horizontal plate portion thus forming the front support plate into a generally C-shape to provide structural strength so that the support plate is essentially self-supporting mounted on mounting brackets (also not shown).

The length of the bracket 25 is arranged so that the front edge 49 of the support plate is spaced rearwardly from the front edge 35 of the upper run of the draper canvas. In addition the front end of the rollers 30 is spaced rearwardly from the front edge 35 of the upper run of the canvas. This recessing of the front edges of the support plate member and of the rollers provides a portion 70 of the front edge of the draper canvas which is cantilevered outwardly beyond the support provided by those elements.

The beam 12 of the cutter bar is shaped so that the top plate portion 13 extends rearwardly to a rear edge 71 which overlaps the portion 70. The rear edge 71 is located therefore at a position rearwardly of the front edge 35 of the draper and in a position forwardly of the front edge 49 of the support plate and the front ends 65 of the draper rollers. That portion of the draper therefore which engages the underside 72 of the top plate portion 13 is unsupported on its underside and is therefore free to flex downwardly should it be depressed downwardly by the presence of material collecting on the under surface 72. The top plate portion 13 of the beam 12 is substantially horizontal that is parallel to the generally horizontal surface of the top strand. The cooperation therefore between the surface 72 of the upper plate portion 13 and the upper surface of the draper canvas at the portion 70 provides a seal which inhibits the tendency of materials to pass between the draper and the cutter bar. This seal therefore inhibits the build-up of materials inside the C-shape of the cutter bar and between the draper top and bottom and around the draper rollers which can of course cause damage.

At the rear edge 36, the draper canvas is guided on the draper roller by a V groove 30A in the roller 30 into which projects from the back of the canvas a V-shaped guide rib 75 which runs along the inner surface of the canvas along its full length.

The draper is symmetrical in that the draper can be reversed by rotating the draper so that the front edge is turned to become the rear edge and vice versa. Thus only the front edge is shown with it being understood that the rear edge is exactly symmetrical. The draper includes a base layer or sheet which is formed of a fabric sheet with a double thickness portion on top of the layer to form an end edge which lies on top of the fabric of the layer 81 spaced away from the edge. The canvas carries a coating or infused rubberized layer in a conventional manner. At the edge is provided a strip 86 of a resilient material. The resilient material is preferably of the same construction as the rubberized coating so that it can be vulcanized with the structure of the canvas and molded in place as part of the manufacturing process. The strip 86 has a front edge 87 which is at or immediately adjacent the edge of the base layer of the canvas. The strip includes a rear edge 88 spaced away from the edge 87 into the body of the canvas. The strip has an upper surface 89 which is flat and smooth. Thus the strip is rectangular with the side edges 87 and 88 being vertical and the top surface 89 horizontal. However the strip may be shaped with inclined or tapered side edges 87 and 88.

In the example shown the strip has the width of the order of 1" (25 mm) and a height of the order of ⅛" (4.0 mm). The strip thus stands up from the upper surface of the base layer of the draper canvas that is the upper surface of the double thickness portion.

On the underside of the draper canvas is molded the bead 75 which is generally V shaped so that the sides are tapered downwardly and inwardly to a bottom surface 75A which is narrower than the base of the bead. The bead is located at a position spaced from the edge 87 but underlying the strip 86 so that the edge of the bead is spaced from the edge 87 by a distance less than the edge 88 of the strip.

Figure 3:
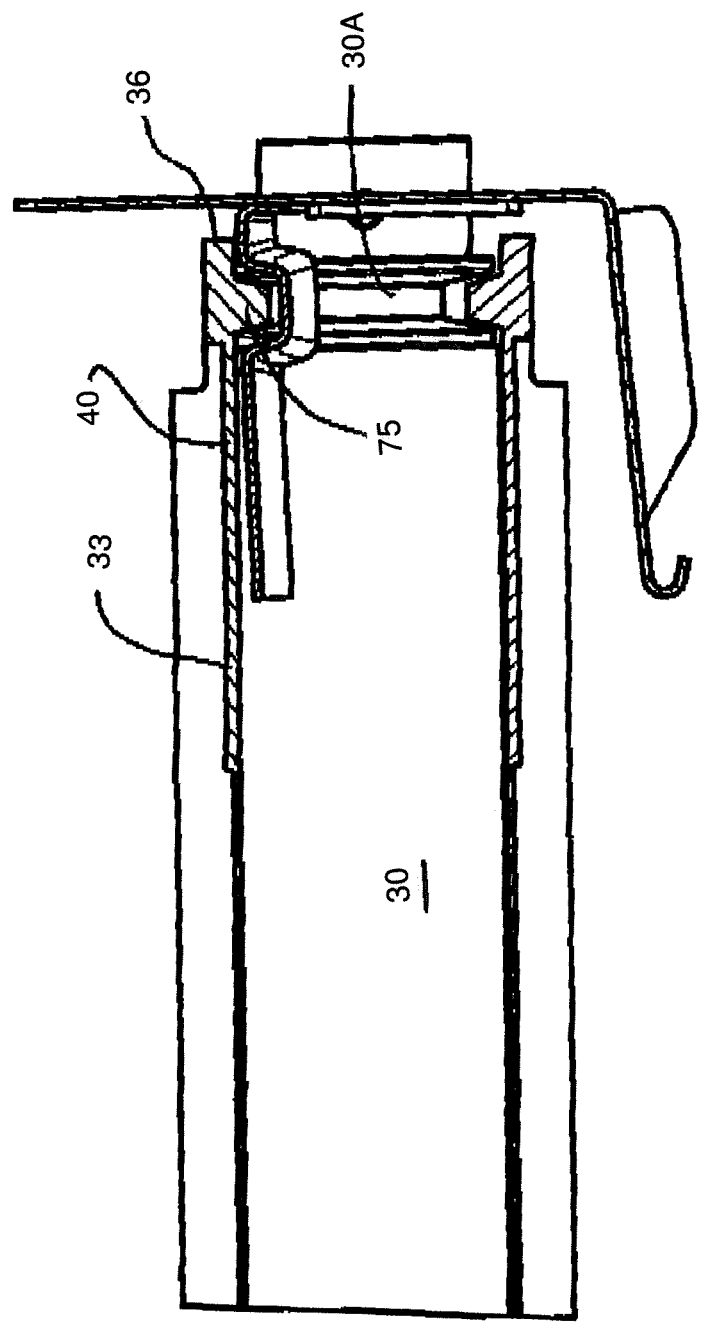
FIG. 3 is a cross sectional view along the lines 2-2 of FIG. 1 showing the rear part of the header and draper and the co-operation of the rear guide bead with a groove in the roller from the PRIOR ART.
Figure 4:
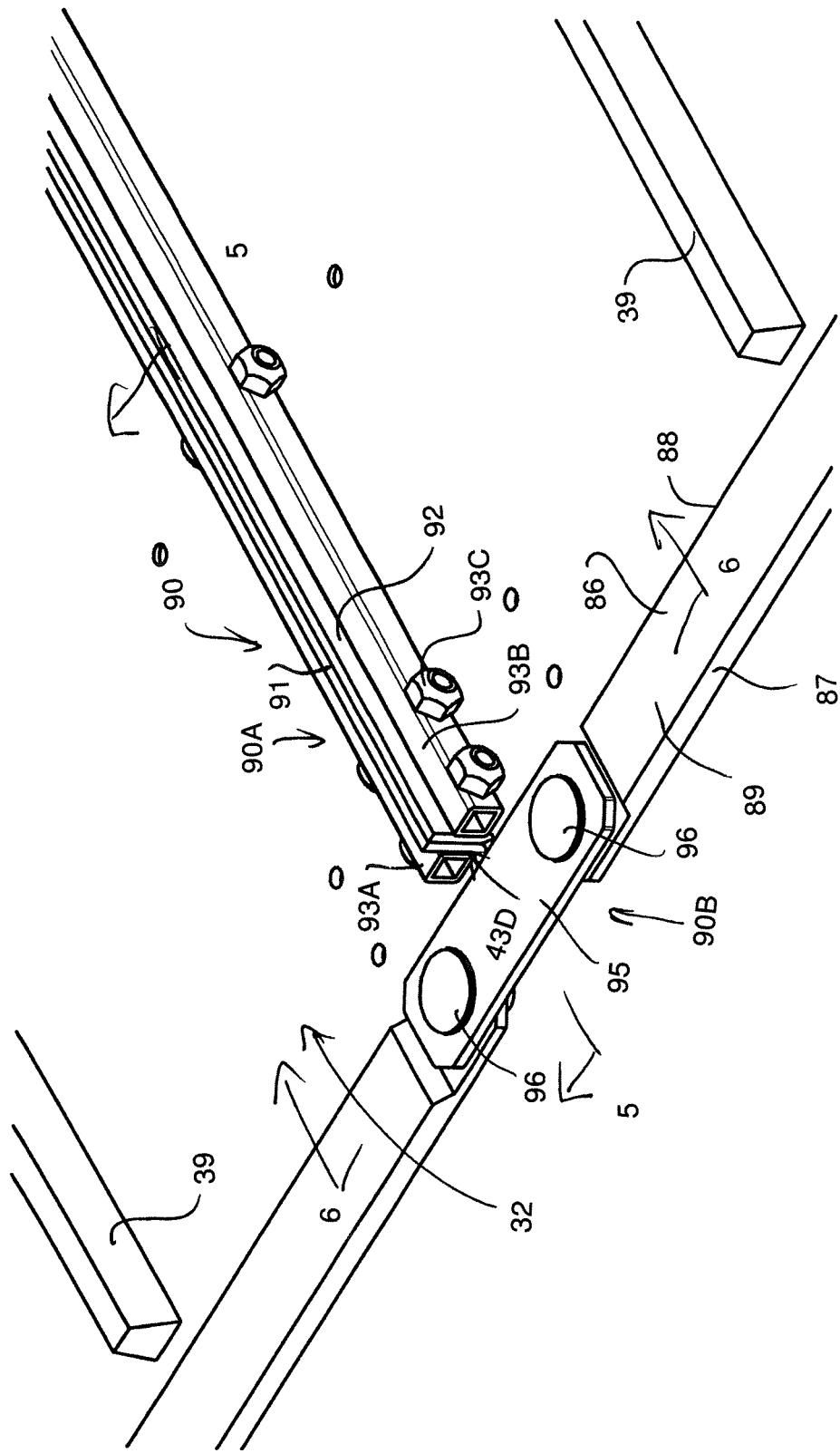
FIG. 4 is an isometric view of a connection according to the present invention between the ends of the draper canvas of the header of FIG. 1.

The canvas also carries slats 39 which stand upwardly from the upper surface of the canvas to a top edge 39A which is at a height significantly greater than the height of the strip 86. Each slat extends transversely across the draper to a position closely adjacent the strip at the respective side edges of the canvas. In the example shown, the bead 75 has a width at its base of the order of ½" (13 mm) and a height from the under-surface of the canvas of the order ⅓" (8 mm). The center of the bead is spaced from the edge 82 by a distance of the order of ⅔" (16 mm). This suitably locates the bead at a position on the canvas for cooperation with the groove in the roller at the rear of the canvas as best shown in FIG. 3.

Figure 2:
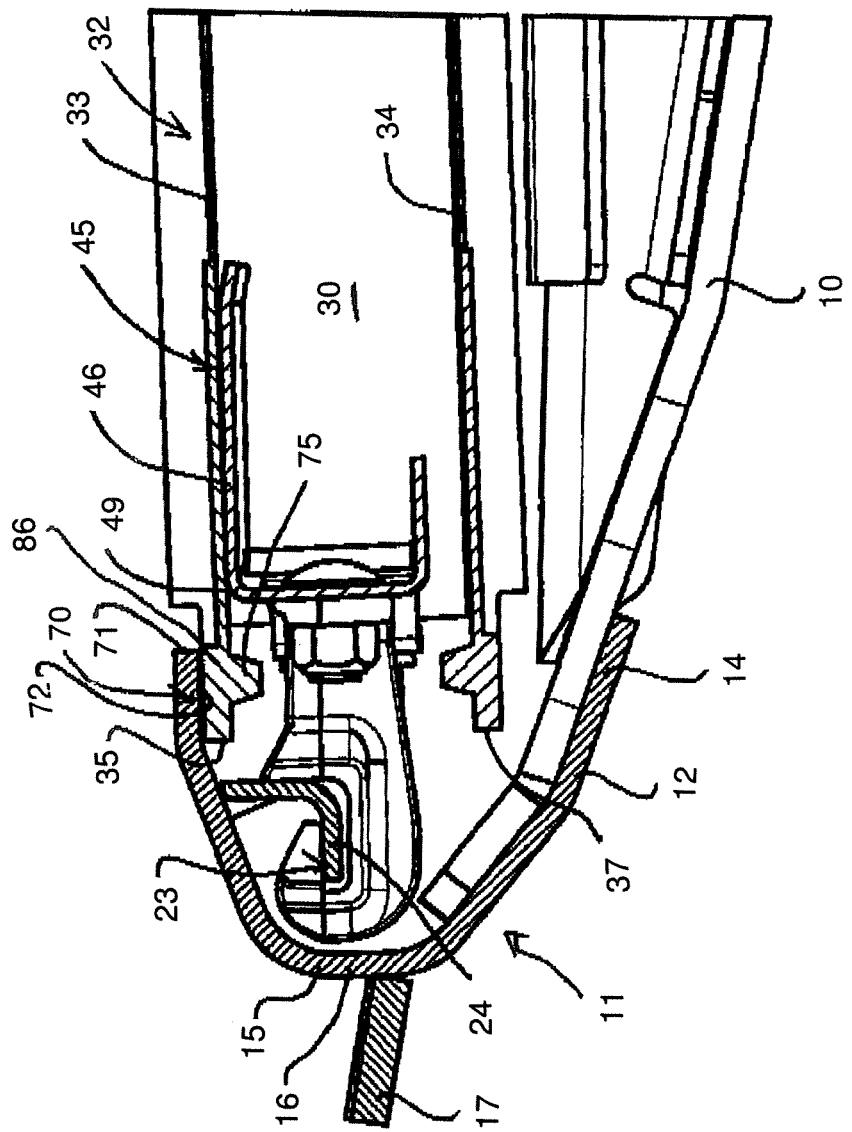
FIG. 2 is a cross sectional view along the lines 2-2 of FIG. 1 showing the front part of the header and draper from the PRIOR ART.

Turning now to FIG. 2, it will be noted that the side edge 88 of the strip is substantially coincident with the end edge 71 of the plate 13 so that the whole of the strip 86 underlies the plate 13. The presence of the strip 86 provides an improved sealing effect between the surface 89 of the strip and the surface 72 of the plate 13 due to an increase in pressure therebetween. In addition the presence of the shoulder or edge 88 provides a raised surface standing upwardly from surface of the canvas to inhibit the penetration of material into the space between the surfaces 89 and 72. The surface 89 is formed as a flat surface molded onto the top of the resilient strip so that the surface 89 can be formed if required. Also it is or can be smoother than the surface of the canvas itself to provide an improved contact surface engaging the surface 72.

It will be noted in FIG. 2 that the bead 75 at the front edge is located at a position spaced forwardly of the edge 49 of the support plate and forwardly of the end of the roller. Thus the bead 75 at the front edge of the canvas has no effect since it is engaging no component of the roller or support plate. However it will be noted that the bead 75 at the rear edge is located in engagement with a groove in the roller. In this way wear of the structure takes place at the strip 86 at the front edge and the bead 75 at the rear edge. These two components are worn in use so that the strip 86 at the rear edge and the bead 75 at the front edge remain unworn. Rotation of the canvas when the wear has become excessive allows therefore the canvas to continue in use while the strip 86 from the rear edge is moved for the sealing effect at the front edge and the bead 75 is moved to the rear edge for providing guiding action.

The arrangement of the present invention provides a connection arrangement for the draper described above. That is the draper is formed as an elongate band of the material with the structure described above where the band includes a coupling 90 of a first end 91 of the band to a second end 92 of the band to form a continuous loop.

Figure 6:
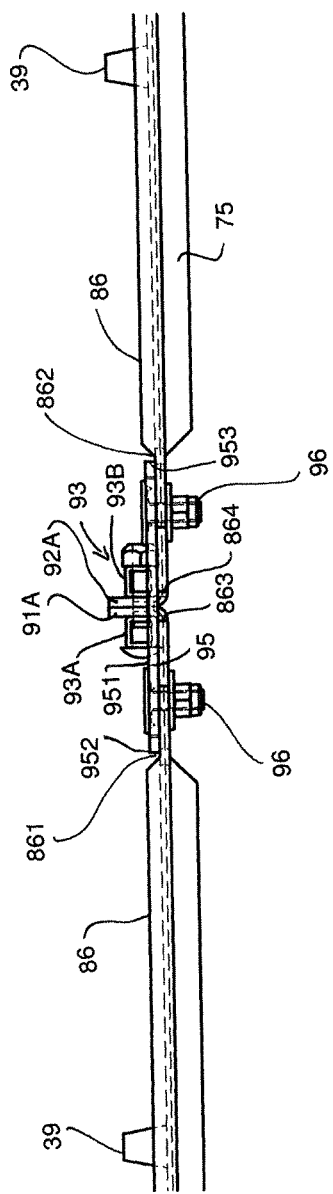
FIG. 6 is a cross sectional view along the lines 6-6 of FIG. 4.

The coupling has two components 90A and 90B with the first comprising a first end edge portion 91A of the band at the first end 91 which is turned so as to stand upwardly from the band and a second end edge 92A at the second end 92 which also is turned so as to stand upwardly from the band and laid side by side as best shown in FIG. 6. A clamping assembly 93 acts to clamp the upwardly standing edges together.

The clamping assembly comprises a pair of tubular members 93A and 93B with one on each side of the standing pair and connected together by a series of screw fasteners 93C. The standing edges and the clamping assembly extend across the band to a front end 93D at or rearward of the rear edge 88 of the additional strip 86.

The second component 90B of the connecting coupling comprises a strip portion 95 formed of a flexible continuous strip material extending longitudinally of the additional band and connecting ends of the additional band 86.

That is the additional band at the first end edge 91 is recessed at 861 to define a first portion thereof at the first end edge 90A which is recessed from the outer surface 89 of the additional strip 86.

That is the additional band 86 at the second end edge 92 is recessed at 862 to define a second portion thereof at the second end edge 92 which is recessed from the outer surface 89 of the additional strip. The strip portion 95 bridges the two recessed portions 861 and 862 to form a connection therebetween.

The strip portion 95 has a width substantially equal to that of the additional band 86. The first and second recessed portions 861, 862 of the band 86 have a thickness of the order of one half of the thickness of the band 86 and the strip portion is slightly less than one half of the thickness of the band 86 so that a top surface 951 of the strip portion is slightly below the top surface 89.

The recessed portions 861 and 862 have ends 863 and 864 which are slightly spaced at the junction between the ends 91 and 92. The strip portion has a length approximately equal to the combined length of the two recessed portions so that the ends 952 and 953 lie closely adjacent ends of the first and second portions 861, 862. In this way the strip portion substantially fills and replaces the area recessed from the band 86 and has an upper surface of the strip portion which lies in a plane no higher than the outer surface 89.

The strip portion is formed of a material which has a flexibility substantially equal to that of the additional band and is formed of a rubber material similar to that of the band 86 so as to provide a similar level of flexibility as the band and the strip portion pass around the guide rollers.

The strip portion 95 is fastened to the recessed portions 861, 862 by first and second bolts 96. Each bolt 96 has a substantially flat head 961 which has an upper surface 962 which lies in a plane no higher than the outer surface 89. In this way the heads do not interfere with the sealing action provided by the band 86 and do not provide an obstruction or abutment which engages the component of the cutter bar described above.

The first and second bolts 96 each have a nut extending downwardly from the inner surface of the canvas at the additional band. This is shaped and arranged such that the nut does not substantially exceed the cross-section of the bead 75 on the inner surface of the canvas at the additional band. This bead can be used in some cases to guide the belt and runs in a groove in the rollers as described above.

The canvas includes the slats 39 extending across the band where a front edge of each slat is located at or rearward of the rear edge of the additional strip 86.

Figure 5:
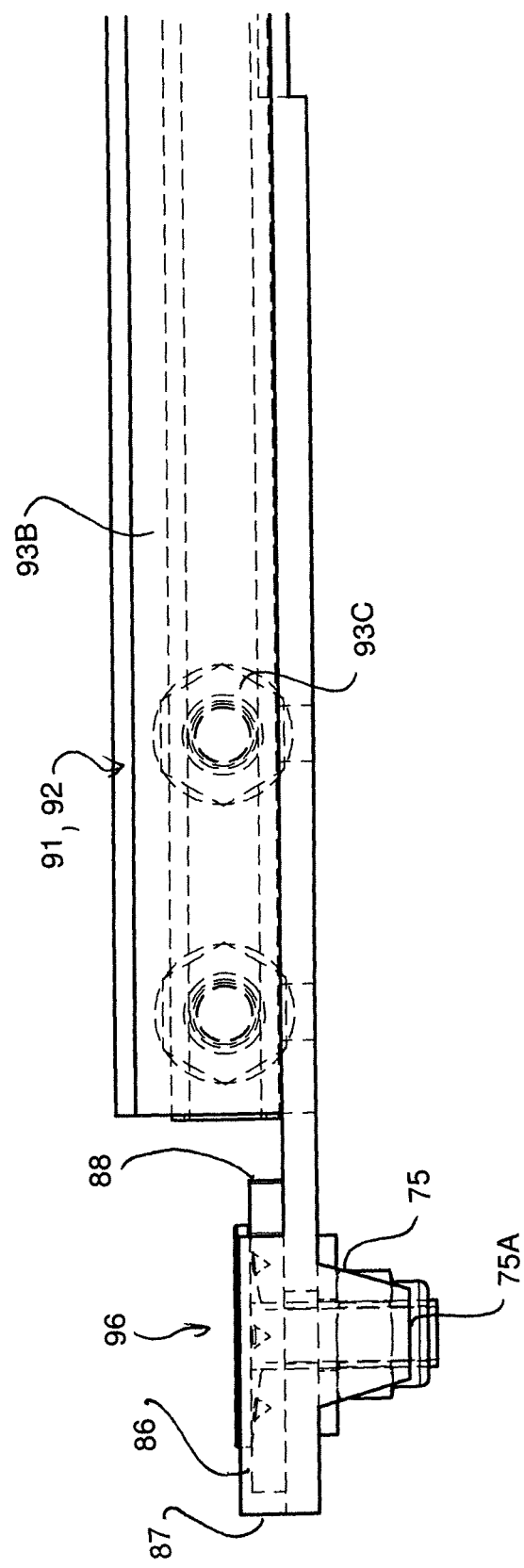
FIG. 5 is a cross sectional view along the lines 5-5 of FIG. 4.

As shown in FIG. 5, the standing portions 91, 92 have a height greater than the upper surface of the strip portion 86. As described above, the additional band is arranged for cooperation with a component of the cutter bar extending rearwardly over the top strand of the draper to a position rearwardly of the front edge of the bottom strand of the draper and engaging the outer surface of said additional strip on the draper canvas so that the engagement between the component of the cutter bar and the outer surface of the additional strip forms a seal to inhibit entry between the cutter bar and the draper canvas of materials carried by the cut crop.

The invention claimed is:

1. A draper for a cutter bar of a harvesting header comprising:
    a band of flexible material wrapped around guide rollers with a top run of the band on top of the rollers and a bottom run of the band below the rollers and with an outer surface of the band which faces outwardly and an opposed inner surface of the band;
    the draper including a base layer of a sheet material having an outer surface, an inner surface, a front edge of the base layer and a rear edge of the base layer;
    the band including an additional strip of a resilient material attached on to the outer surface of the base layer at or adjacent the front edge of the base layer standing outwardly from the outer surface of the base layer and extending rearwardly from the front edge of the base layer to a rear edge of the additional strip spaced rearwardly of the front edge of the base layer and forwardly of the rear edge of the base layer;
    the additional strip standing outwardly of the outer surface from the base layer and having an outer surface of the additional strip raised from the base layer;
    the band including a coupling of a first end of the band to a second end of the band to form a continuous loop;
    the coupling comprising a first end edge at the first end which is turned and stands outwardly from the band, a second end edge at the second end which is turned and stands outwardly from the band and a clamping assembly for clamping the turned first and second end edges together;
    the first and second end edges and the clamping assembly extending across the band to a front end at or rearward of the rear edge of the additional strip;
    the additional strip at the first end edge being recessed and having a first recessed portion thereof at the first end edge having an outer surface of the first recessed portion which is recessed from the outer surface of the additional strip;

the additional strip at the second end edge being recessed and having a second recessed portion thereof at the second end edge having an outer surface of the second recessed portion which is recessed from the outer surface of the additional strip;

and a connecting strip portion formed of a flexible continuous strip material extending longitudinally of the additional strip and connected to the outer surface of the first recessed portion and connected to the outer surface of the second recessed portion.

2. The draper according to claim 1 wherein the connecting strip portion is fastened by first and second bolts respectively to the first and second recessed portions.

3. The draper according to claim 1 wherein the connecting strip portion has a width no greater than that of the additional strip.

4. The draper according to claim 1 wherein the connecting strip portion has a width substantially equal to that of the additional strip.

5. The draper according to claim 1 wherein the first and second recessed portions have a thickness of the order of one half of the thickness of the additional strip.

6. The draper according to claim 1 wherein the connecting strip portion has ends closely adjacent ends of the first and second recessed portions.

7. The draper according to claim 1 wherein the connecting strip portion is formed of a material which has a flexibility substantially equal to that of the additional strip.

8. The draper according to claim 1 wherein the connecting strip portion is formed of a rubber material.

9. The draper according to claim 1 wherein an outer surface of the connecting strip portion lies in a plane no higher than an outer surface of the additional strip.

10. The draper according to claim 1 wherein the connecting strip portion is fastened by first and second bolts respectively to the first and second recessed portions, each bolt having a substantially flat head which has an upper surface which lies in a plane no higher than the outer surface of the additional strip.

11. The draper according to claim 10 wherein the first and second bolts each have a nut extending inwardly from the inner surface of the band at the additional strip.

12. The draper according to claim 11 wherein there is provided a guide bead on the inner surface of the band at the additional strip and wherein the nut does not substantially exceed the cross-section of the bead.

13. The draper according to claim 1 wherein the band includes a plurality of slats extending across the band where a front edge of each slat is located at or rearward of the rear edge of the additional strip.

14. The draper according to claim 1 wherein the turned first and second edges have a height greater than an outer surface of the connecting strip portion.

15. The draper according to claim 1 wherein the clamping assembly comprise a pair of tubes each on a respective side of the turned first and second edges.

16. The draper according to claim 1 wherein the additional strip is arranged for cooperation with a component of the cutter bar extending rearwardly over the top run of the draper to a position rearwardly of the front edge of the top run of the draper and engaging the outer surface of said additional strip on the draper so that the engagement between the component of the cutter bar and the outer surface of the additional strip forms a seal.

\* \* \* \* \*